(12) United States Patent
Dick

(10) Patent No.: US 9,211,927 B1
(45) Date of Patent: Dec. 15, 2015

(54) CYCLING SEAT ASSEMBLY

(71) Applicant: Michael Dick, Whitby (CA)

(72) Inventor: Michael Dick, Whitby (CA)

( * ) Notice: Subject to any disclaimer, the term of this patent is extended or adjusted under 35 U.S.C. 154(b) by 0 days.

(21) Appl. No.: 14/497,634

(22) Filed: Sep. 26, 2014

(51) Int. Cl.
*B62J 1/00* (2006.01)
*B62J 1/18* (2006.01)
*B62J 1/08* (2006.01)

(52) U.S. Cl.
CPC .. *B62J 1/005* (2013.01); *B62J 1/08* (2013.01); *B62J 1/18* (2013.01); *B62J 1/007* (2013.01)

(58) Field of Classification Search
CPC ............. B62J 1/005; B62J 1/007; B62J 1/002
USPC ......................................................... 297/201
See application file for complete search history.

(56) References Cited

U.S. PATENT DOCUMENTS

| | | | |
|---|---|---|---|
| 471,417 A * | 3/1892 | Bunker | 297/195.1 |
| 4,176,880 A | 12/1979 | Marchello | |
| 4,387,925 A * | 6/1983 | Barker et al. | 297/201 |
| 4,613,187 A | 9/1986 | Gordon | |
| D295,120 S | 4/1988 | Gordon | |
| D348,785 S | 7/1994 | White | |
| 5,725,274 A * | 3/1998 | Bergmeister | 297/201 |
| D406,471 S | 3/1999 | Trotter | |
| 6,074,002 A * | 6/2000 | Hansen | 297/201 |
| D429,906 S | 8/2000 | Hansen | |
| 6,139,098 A * | 10/2000 | Carrillo | 297/202 |
| 6,971,715 B2 * | 12/2005 | Hankins | 297/219.11 |
| 7,494,181 B2 | 2/2009 | Tucker | |
| D626,038 S | 10/2010 | Li | |
| 8,567,806 B2 * | 10/2013 | Yuan | 280/281.1 |
| 8,998,314 B2 * | 4/2015 | Eldredge | 297/201 |
| 2010/0289246 A1 * | 11/2010 | Williams | 280/281.1 |
| 2013/0175783 A1 * | 7/2013 | Yuan | 280/281.1 |
| 2014/0132047 A1 * | 5/2014 | Eldredge | 297/201 |
| 2014/0333102 A1 * | 11/2014 | Eldredge | 297/208 |
| 2015/0191207 A1 * | 7/2015 | Eldredge | B62J 1/005 297/201 |

FOREIGN PATENT DOCUMENTS

GB  2381779 A  *  5/2003

* cited by examiner

*Primary Examiner* — Rodney Mintz

(57) ABSTRACT

A cycling seat assembly provides a more comfortable riding experience for a person on a bicycle, tricycle or the like. The assembly includes a seat having a pair of seat sections each including a rod and a cushion positioned around the associated rod. At least one arm is attached to and extends between the rods. A mount is attached to the seat wherein the mount is configured for coupling the seat to a seat tube of a bicycle.

8 Claims, 3 Drawing Sheets

CYCLING SEAT ASSEMBLY

BACKGROUND OF THE DISCLOSURE

Field of the Disclosure

The disclosure relates to seat assemblies and more particularly pertains to a new seat assembly for providing a more comfortable riding experience for a person on a bicycle, tricycle or the like.

SUMMARY OF THE DISCLOSURE

An embodiment of the disclosure meets the needs presented above by generally comprising a seat having a pair of seat sections each including a rod and a cushion positioned around the associated rod. At least one arm is attached to and extends between the rods. A mount is attached to the seat wherein the mount is configured for coupling the seat to a seat tube of a bicycle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
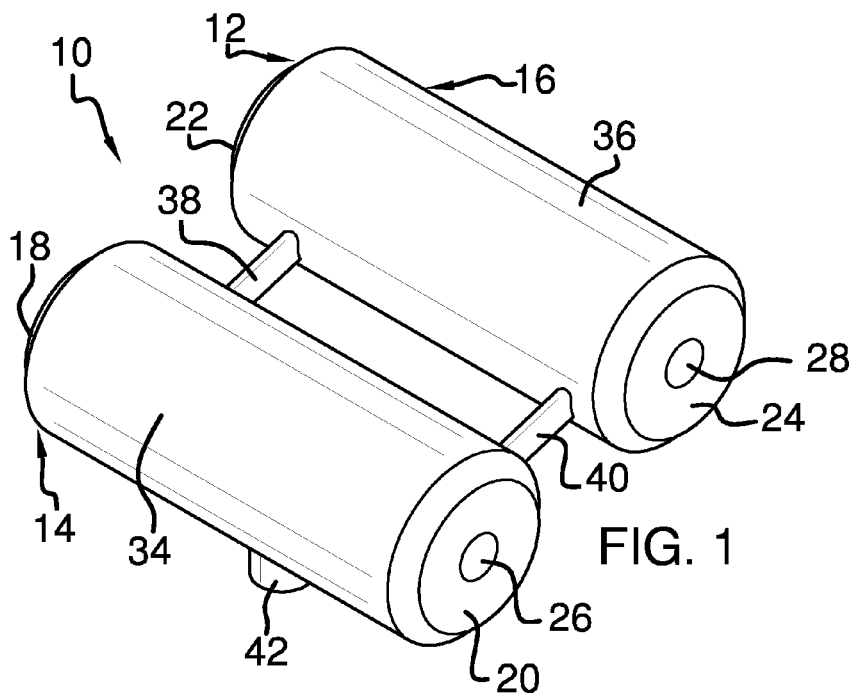
FIG. 1 is a top front side perspective view of a cycling seat assembly according to an embodiment of the disclosure.
Figure 2:
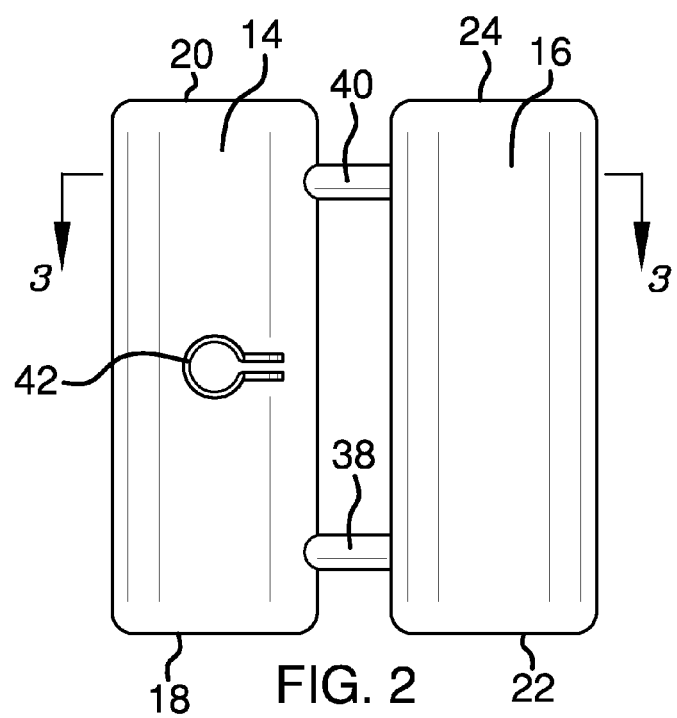
FIG. 2 is a bottom view of an embodiment of the disclosure.
Figure 3:
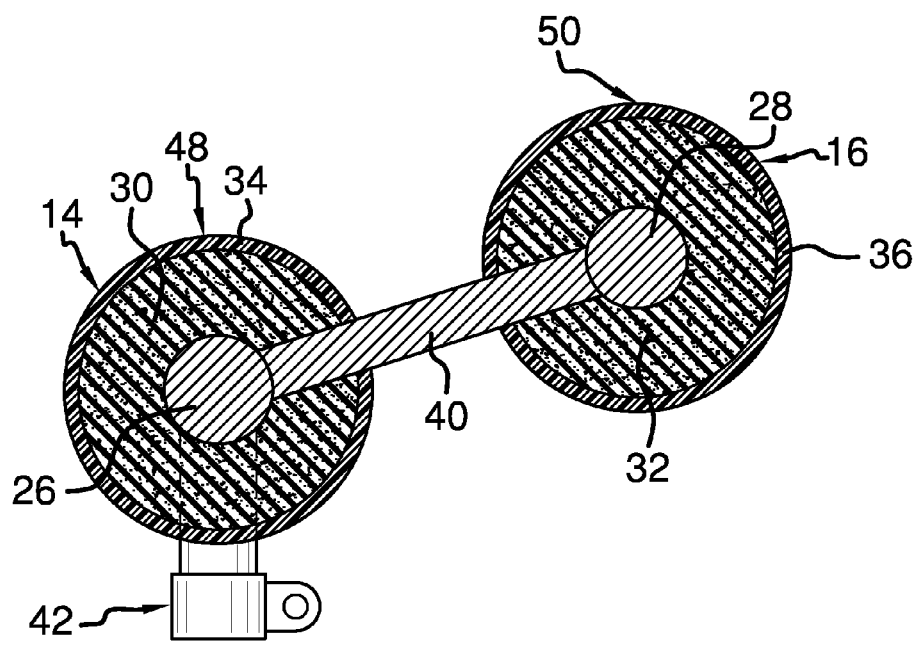
FIG. 3 is a cross-sectional view of an embodiment of the disclosure taken along line 3-3 of FIG. 2.
Figure 4:
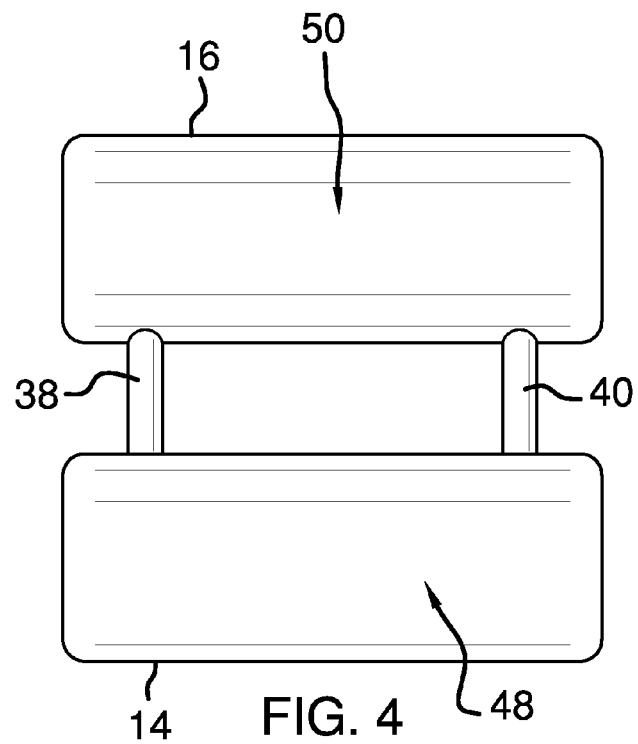
FIG. 4 is a top view of an embodiment of the disclosure.
Figure 5:
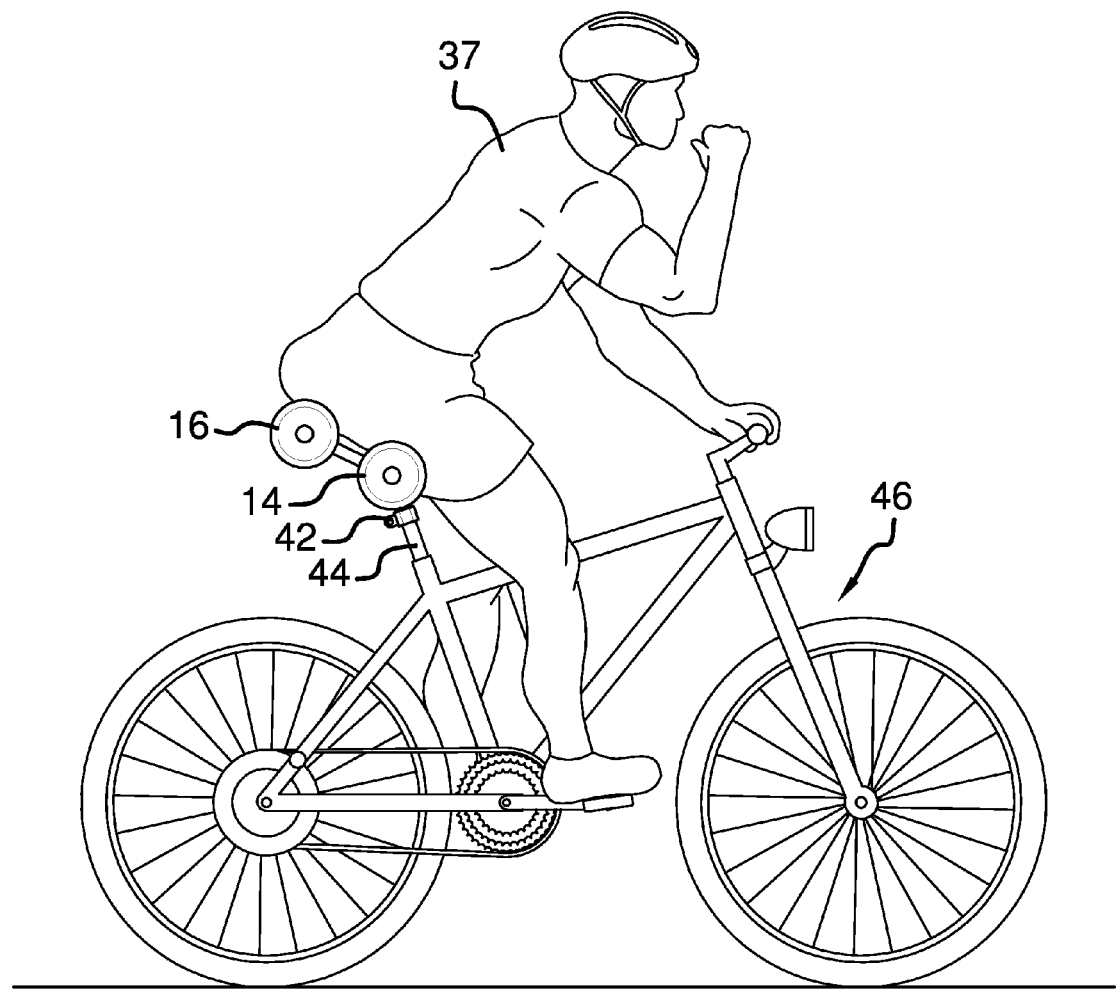
FIG. 5 is an in-use side view of an embodiment of the disclosure.

With reference now to the drawings, and in particular to FIGS. 1 through 5 thereof, a new seat assembly embodying the principles and concepts of an embodiment of the disclosure and generally designated by the reference numeral 10 will be described.

As best illustrated in FIGS. 1 through 5, the cycling seat assembly 10 generally comprises a seat 12 having a pair of seat sections 14, 16 that are spaced from each other. The seat sections 14, 16 may each be cylindrical. Each of the seat sections 14, 16 has a respective pair of outer ends 18, 20, 22, 24. A longitudinal axis extends through each of the seat sections 14, 16 between the outer ends 18, 20, 22, 24. The longitudinal axis of each seat section 14, 16 may be parallel with respect to each other. The outer ends 18, 20, of a first one 14 of the seat sections 14, 16 may be aligned with respect to the outer ends 22, 24 of a second one 16 of the seat sections 14, 16.

Each of the seat sections 14, 16 further includes a rod 26, 28 and a cushion 30, 32 positioned around the associated rod 26, 28. The rods 26, 28 are each comprised of a rigid material, such as metal or the like. Each cushion 30, 32 may comprise foam, neoprene, gel or like material. A pair of covers 34, 36 may be provided wherein each of the covers 34, 36 is positioned around and completely covers the associated cushion 30, 32 for protecting the associated cushion 30, 32. Each of the rods 26, 28 may have a length measuring between approximately 38.0 cm (15 in) and 46.0 cm (18 in) and each may have an outer diameter between approximately 1.5 cm (0.6 in) and 3.0 cm (1.2 in). Between approximately 5.0 cm (2.0 in) and 10.0 cm (4.0 in) of each cushion 30, 32 may be provided in order to provide enhanced comfort to a person 37 sitting on the seat sections 14, 16. At least one arm, though preferably a pair of arms 38, 40, is attached to and extends between the rods 26, 28. The arms 38, 40 are spaced and parallel with respect to each other. Each of the arms 38, 40 may have a length between approximately 7.0 cm (2.75 in) and 10.0 cm (4.0 in).

A mount 42 is attached to the seat 12 wherein the mount 42 is configured for coupling the seat 12 to a seat tube 44 of a bicycle 46. The mount 42 is attached to and extends downwardly from an associated one of the rods 26, 28. A top side 48 of the first one 14 of the seat sections 14, 16 is spaced above an upper end 50 of the second one 16 of the seat sections 14, 16 such that the first one 14 of the seat sections 14, 16 is elevated relative to the second one 16 of the seat sections 14, 16 when the seat 12 is attached to the seat tube 44.

In use, the seat 12 is attached to the seat tube 44 of a bicycle 46. A person 37 then sits on the seat 12 such that the person's buttocks abuts the top side 48 of the first one 14 of the seat sections 14, 16 and a back surface of the person's thighs abuts the upper end 50 of the second one 16 of the seat sections 14, 16. In this manner, the assembly 10 helps prevent discomfort to a crotch region of the person 37 when the person 37 is sitting on the seat 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A cycling seat assembly comprising:
   a seat having a pair of seat sections each including a rod and
      a cushion positioned around said associated rod, each of
      said seat sections having a respective pair of outer
      ends, a longitudinal axis extending through each of
      said seat sections between said respective outer ends,
      said longitudinal axis of each of said seat sections
      being parallel to each other;
   a pair of arms, said arms being spaced and parallel with
      respect to each other, each of said arms being attached to and extending transversely between said rods, each said arm being inwardly spaced from an associated pair of said outer ends of said seat sections; and a mount attached to said seat wherein said mount is configured for coupling said seat to a seat tube of a bicycle.

2. The assembly of claim 1, further comprising each of said seat sections being cylindrical.

3. The assembly of claim 1, further comprising wherein each said cushion comprises foam.

4. The assembly of claim 1, further comprising a pair of covers, each of said covers being positioned around and completely covering an associated one of said cushions.

5. The assembly of claim 1, further comprising wherein a top side of a first one of said seat sections is spaced above an upper end of a second one of said seat sections such that said first one of said seat sections is elevated relative to said second one of said seat sections when said seat is attached to the seat tube.

6. The assembly of claim 1, further comprising said mount being attached to and extending downwardly from an associated one of said rods.

7. The assembly of claim 1, further comprising wherein said outer ends of a first one of said seat sections is aligned with respect to said outer ends of a second one of said seat sections.

8. A cycling seat assembly comprising:

a seat having a pair of seat sections each being cylindrical, each of said seat sections having a pair of outer ends, a longitudinal axis extending through each of said seat sections between said outer ends, said longitudinal axis of each of said seat sections being parallel to each other, said outer ends of a first one of said seat sections being aligned with said outer ends of a second one of said seat sections, each of said seat sections further including;

a rod; and a cushion positioned around said associated rod, each said cushion comprising foam;

a pair of arms attached to and extending between said rods, said arms being spaced and parallel with respect to each other;

a pair of covers, each of said covers being positioned around and completely covering said associated cushion; and a mount attached to said seat wherein said mount is configured for coupling said seat to a seat tube of a bicycle, said mount being attached to and extending downwardly from an associated one of said rods, a top side of said first one of said seat sections being spaced above an upper end of said second one of said seat sections such that said first one of said seat sections is elevated relative to said second one of said seat sections when said seat is attached to the seat tube.

* * * * *